Nov. 3, 1970     D. G. KEITH ET AL     3,537,929
PROCESS FOR PRODUCING MOLDED SHAPED FOAM LAMINATES
Original Filed May 24, 1965
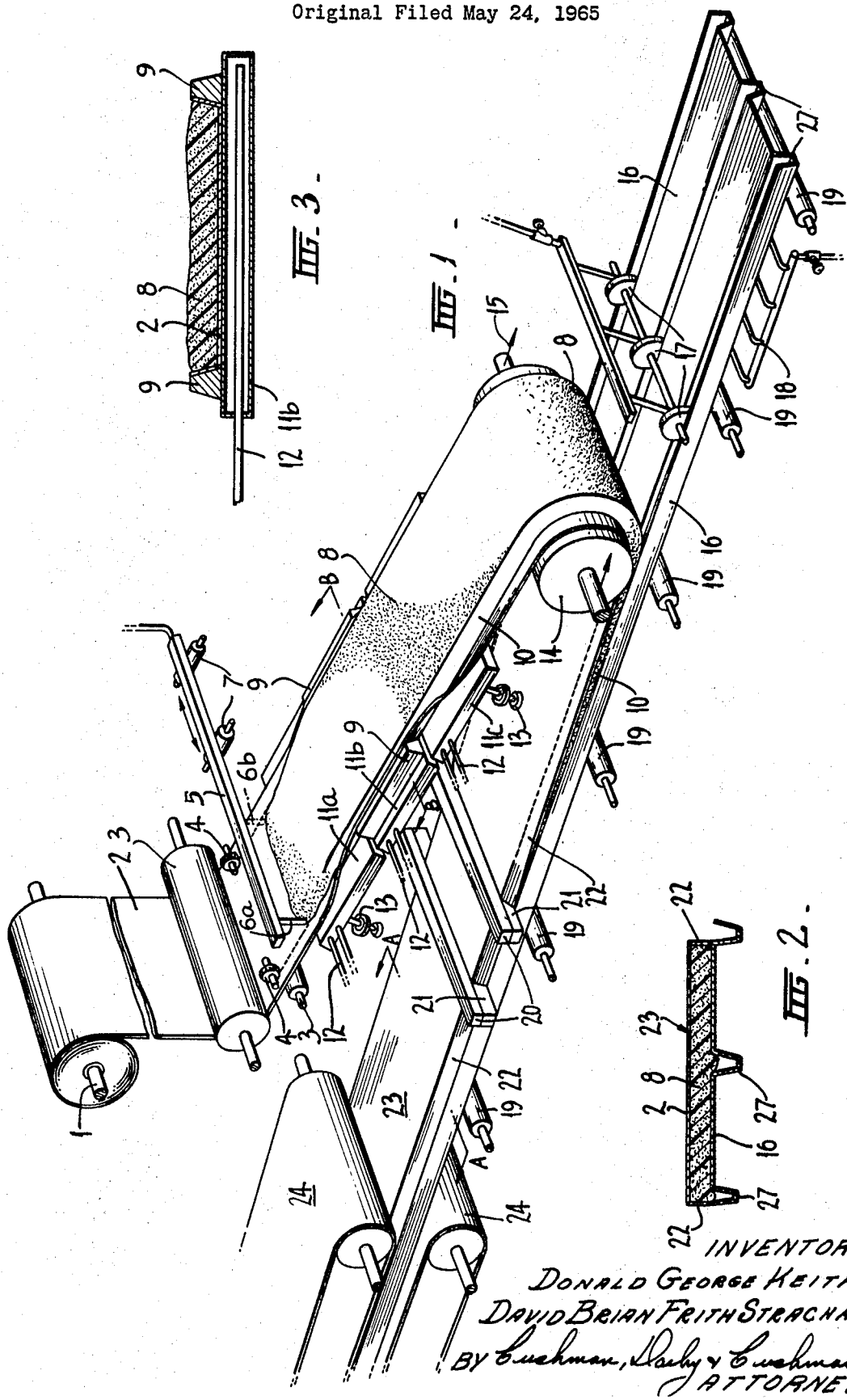
INVENTORS
DONALD GEORGE KEITH
DAVID BRIAN FRITH STRACHAN
BY Cushman, Darby & Cushman
ATTORNEYS

United States Patent Office 3,537,929
Patented Nov. 3, 1970

3,537,929
PROCESS FOR PRODUCING MOLDED SHAPE FOAM LAMINATES
Donald G. Keith, 32 Volitans Ave., Mount Eliza, Victoria, Australia, and David B. F. Strachan, 5 Garden Ave., Brighton, Victoria, Australia
Continuation of application Ser. No. 458,237, May 24, 1965. This application June 16, 1969, Ser. No. 838,003
Claims priority, application Australia, June 9, 1964, 45,541/64
Int. Cl. B29c 7/02; B32b 5/18
U.S. Cl. 156—79                                26 Claims

ABSTRACT OF THE DISCLOSURE

A process for making foam laminates in which foam is deposited on a moving flexible skin, and when the foam ceases to flow inverting and impressing the foam against a second moving shaped skin, curing and bonding.

---

This case is a continuation of the application, Ser. No. 458,237, filed May 24, 1965.

This invention relates to a process for the continuous manufacture of foam laminates which may be used as light weight structural units and insulating material e.g. in the building and packaging industries.

Processes for the continuous manufacture of multi-layer foam laminates consisting of a plastic foam contained between layers of skins are already known.

A process is known for continuously producing rigid skinned foam sandwich board by foaming in situ between two rigid outer skins, comprising continuously distributing the foam reactants from a dispenser between said outer skins whilst moving said outer skins continuously past said dispenser.

When the surface of either of said skins deviates from a simple planar shape as e.g. in the case where the substrate is a corrugated rigid sheet, the surface of the developed foam also tends to deviate from a plane. In general it is then difficult to produce foam of a shape matching the shape of the second skin and the latter must either be pressed into the foam, which leads to irregularities in foam density and strength or irregular gas cavities may be formed between the skins. Thus when the substrate is a corrugated iron sheet the foam tends to rise unevenly owing to flow from the ridges of the corrugations to the valleys and the resultant foam surface appears as a somewhat irregular corrugated sheet, the height of the corrugations of which is substantially less than that of the substrate; consequently the surface is neither identical with that of the substrate nor planar.

Furthermore frequently the minimum thickness of the foam layer required may be so small that the use of a foam dispenser traversing internally between the skins as described in application No. 18,974/62 may be impractical. Even where uniformity of foam structure may not be critical and where it is therefore permissible to force the foam under pressure into irregularities of the shape of the skins, this may be wasteful of foaming ingredient. For certain application e.g. insulated corrugated roofs in buildings, a different type of laminate consisting of a single substrate and a foam layer may be satisfactory provided the foam surface is planar. Thus the foam may need to have an even planar surface for ease of assembly or for aesthetic reasons. For this type of laminate again the process of direct deposition of a self-rising foam on a non-planar surface is unsatisfactory.

We have now found that plastic foam laminates consisting of a foam layer of uniform texture confined between two skins of differing predetermined surface contours may be produced by depositing the nascent foam on a first skin of the desired regular surface shape, e.g. planar shape, allowing the foam to rise and set to such a consistency that, while remaining tacky, it ceases to flow under the forces of gravity, inverting said substrate-foam laminate and impressing the now self-supporting but still plastic and adhesive foam onto a second skin of the desired non-planar shape until the foam adheres to said second skin.

Accordingly we provide a process for the continuous manufacture of foam laminates consisting of at least one foam layer of uniform texture confined between two skins of differing predetermined surface contours comprising passing a first flexible skin having a surface of a predetermined desired shape continuously through guiding means underneath a foam dispenser, depositing an even layer of nascent foam on said first skin, while the latter either is sufficiently rigid in itself or by means of supports is made sufficiently rigid to impart its own shape to the underside of the foam, causing said foam layer to rise while travelling with said first skin, to adhere to it and to set to such consistency that essentially it ceases to flow under the force of gravity, inverting said first skin- and foam-layer laminate while the foam is still tacky and impressing the tacky foam surface onto a second continuous skin having a non-planar surface of a predetermined desired shape and travelling at the same speed and in the same direction as, and in close proximity to, and underneath the inverted first skin-foam laminate and causing said foam to fully cure and bond to both skins.

As the first skin, referred to hereinafter for convenience as the substrate, a large number of materials is suitable e.g. paper, cardboard, plastic film such as polythene, polypropylene, polyethylene terepuhthalate, polyvinyl chloride, polyvinylidene chloride, nitrocellulose film, textiles, particularly densely woven cloth, sheet metal foil, flexible hardboard and the like. In the term continuous we include semi-continuous or continuous ribbons made by pre-assembly of integers e.g. by the linking of a series of rectangular sheets to foam a ribbon e.g. by means of plastic tape. By flexible we mean essentially capable of being inverted without fracture or other damage to said ribbon; thus the limited flexibility of thin metal foil is sufficient; however, most convenient in practice are fully flexible sheets such as paper or plastic film. In the latter case the film may not be rigid enough to determine the shape of the foam and guiding means such as a casting table, a rigid netting or a series of guide rollers may be required to support said skin throughout the passage of the foam in its flowable state. The most convenient means is a casting table slightly inclined to the horizontal plane and provided with heating means. The shape of the film may vary; in the practice of continuous manufacture it is usually a ribbon of even width. The predetermined shape of the surface required most frequently is that of a plane, preferably smooth so that it is satisfying aesthetically when used as an exposed surface in building or packaging; regular patterns may, however, be imparted to the film, such as relief designs or corrugations provided that the required flexibility at the point of inversion is retained. When the depth of the relief pattern is small, say from several thousandths to about one tenth of the ultimate foam thickness, the foam usually equalises the unevennesses of the pattern by flow under gravity and the final top surface may still be planar and even; when the pattern is deep it may, optionally, be desirable to provide means for levelling the top layer of the foam such as an patent application No. 29,534/63 (U.K. Pat. 1,016,719, U.S. application Ser. No. 378,801). To achieve even distribution of the nascent foam it is preferred that the dispenser traverses at a right angle across and above the moving substrate to within a short distance from either end of said substrate in a manner known per se. Additional means for controlling the width of the nascent foam e.g. guides folding up the two free edges of said substrate where they are not covered by foam against the foam bed so as to prevent overflow on the sides may be used; however, when the flow of the foam is suitably controlled by the viscosity and rate of gelation of the foam as is a known technique e.g. for polyurethane foams, this is not always necessary. The rate of foaming, setting and bonding may be adjusted by temperature control; conveniently this is achieved by regulating the temperature of the supporting means for said substrate e.g. the casting table, in one or more zones. The residence time on the table may be adjusted by the rate of feed of the substrate and the length of the table; for polyurethane foams residence times between 10 and 40 seconds are usually satisfactory.

By inverting the laminate formed between the substrate and the foam we mean that the foam changes from its initial position of rest on the substrate to a position where it depends from the skin and clings to it by virtue of its adhesive properties. In practice the table on which the bond between the substrate and the foam is formed is usually horizontal or somewhat inclined to the horizontal plane at an angle alpha and the foam turns through approximately 180° or 180-alpha to be guided along a second supporting surface in a horizontal or near-horizontal plane. Inversion may be carried out in more than one way e.g. by twisting the skin about 180° along its axis of travel, usually progressively in several steps through a sequence of say 4 rollers each of which is inclined at an angle of 45° in a vertical plane to the ribbon or the preceding roller respectively. In this case the laminate travels in one direction throughout the process, but the inversion requires a somewhat long distance. A preferred method of inverting comprises turning the substrate-foam laminate at the point where the foam is a shaky, self-supporting and no longer freely flowing gel through approximately 180° or 180-alpha° about a roller guiding and contacting the substrate on its underside. In the same direction and at the same speed as the inverted substrate-foam laminate a continuous ribbon of the second skin having a non-planar surface is possed under and towards the tacky surface of the foam along supporting means, e.g. a table or a sequence of rollers, in a near horizontal plane and the foam surface of the substrate-foam laminate is pressed against the second skin by compressing means e.g. a roller or a skid, i.e. one or more highly polished metal bars or plates extending across the width of said substrate-foam laminate and having rounded-off smooth edges; conveniently the angle of impression of the skid on the substrate and the force of impression are adjustable e.g. by suspending one end of the skid on a pivoting point and loading the other end with a weight or spring. The skid or roller may also be used to smooth out any remaining unevennesses on the substrate and/or to impress longitudinal patterns, if desired, while the foam is still plastic. The ribbon of the second skin may be truly continuous e.g. corrugated plastic sheet extruded continuously or it may be assembled from integers, e.g. tiles or galvanised iron sheets tacked together by plastic tape or clamped together. It is possible to impress the substrate-foam in its plastic state onto the non-planar skin in such a manner that the irregularties of said second skin are completely or partly filled with the foam, but this may require considerable force and may lead to distortion, irregularities in structure and low compressive strength; it is a particular advantage of our process that satisfactory laminates can be made by merely partial contact between the tacky foam and the non-planar skin e.g. along the ridges of the corrugation of the iron sheet and that ingress of the foam into cavities in the non-planar skin can essentially be avoided. This is particularly useful when the cavities should remain free of foam because they fulfill a mechanical function as e.g. in the case of steel roof decking sheeting where the vertical ridges, at least at the edges of the non-planar skin, may be designed to form a clip-in joint and should not be blocked.

Accordingly we also provide a process for the continuous manufacture of a laminate consisting of a grooved metal sheet and a foam-insulating layer characterised in that the grooves of said metal sheet on the side where the foam is joined to the said sheet are at least partly free from foam.

Optionally the foam layer may be sealed on its edges by turning the edges of the substrate, where they are free of foam deposit, by 90° towards the vertical edges of the foam; this may be done conveniently at a point before the inversion by turning the edges upwardly to contain the viscous foam or after the inversion by turning them downwardly or optionally both before and after inversion. This operation assists in forming a sharp edge and obtaining neat finish; in the case of roofing it further facilitates the joining of grooved metal sheets at their uninsulated edges.

Accordingly we also provide a process as described characterised further in that the edges of the substrate which extend beyond the foam layer are turned through 90° to provide a lateral seal of the foam layer.

When it is not desired to attach the turned-up edge strip of the substrate permanently to the polyurethane layer the edge strip is best detached from the foam layer again before it is inverted. To this end the edge of the substrate may, optionally, be pre-coated by an anti-adhesive rapid release coating such as a silicon oil or paraffin wax coating. This facilitates detachment of the turnedup edges from the foam at the point where the polyurethane foam has gelled sufficiently to retain the shape of the edge so formed. If, on the other hand, it is desired to retain the edge in its turned-up position permanently, adhesive may be deposited on the edge to improve the bond to the foam layer; the first flexible skin is then preferably expandable e.g. crepe-paper or polythene film and the radius of the roller around which inversion takes place is made wide so as to prevent excessive radial expansion and distortion of the turned-up strip at the point of inversion.

Suitable means for turning are e.g. one or more wedges of triangular cross-section forming a gradually increasing wedge angle towards the plane of the laminate; the wedges are positioned at either edge of the laminate and protrude between the substrate and the supporting means towards the edge of the foam layer thus forcing the film edge gradually towards the quasivertical edge of the foam until the angle of said wedge is 90°. Other edge forming tools, e.g. a bent-up metal railing may be used. Optionally and additionally one or more cylindrical rollers having a width equal to or less than the height of the foam layer, positioned at either edge and having their axes of rotation vertical to the plane of travel of the laminate may be used to compress the film edges against the vertical foam edges.

To improve control of curing of the foam the non-planar second skin may be pre-heated and/or its supporting means may be temperature controlled. Direct gas heating, electrical heating and indirect heating by means of a heat exchange medium such as hot air or through heating coils may be used.

Under certain conditions of temperature, feed rate and certain characteristics of the foam it is difficult to select an ideal point of inversion in that the foam must be shape-retaining yet flexible enough to tolerate the differential radial expansion at the point of inversion. In addition it is desirable to retain tackiness of the open foam surface beyond the point of inversion. To this end curing of the open foam surface may be deliberately retarded locally. Accordingly it is a further feature of our process to blow a stream of inert coolant gas on to the open foam surface before or at the point of inversion.

We have furthermore found that for effective control of the rate of curing of the foam and for attaining the desired viscosity, consistency and tackiness, the timing of the operation, particularly of inverting the substrate and of pressing the foam against the second skin may be critical. The required residence time may vary widely with chemical compositions of different foam recipes, with the surface characteristics of various skins and even with temperature and atmospheric conditions. We have appreciated that sensitive and flexible control of the residence time may be achieved particularly conveniently by fine adjustment of the length of traverse between the foam dispenser and the point of inversion.

Accordingly we also provide a process as described characterised further in that the residence time of the foam before inversion is adjusted by moving the inverting means forward or backward respectively, approximately in the direction of travel of the substrate. Our process may be controlled further and is characterised further in that the point at which the foam is pressed on to the non-planar second skin is adjusted by moving the impressing means, e.g. the roller or skid, forward or backward substantially in the direction of travel of the second skin; optionally it is characterised further in that the point at which the edges of the foam are sealed by the edges of the substrate is controlled by moving the edge-turning tool forward or backward in the direction of travel of the laminate.

When tensile strength or decorative effects are desired the first flexible skin may, in particular, be made of a textile reinforced plastic sheet such as widely used for interior furnishings e.g. in upholstery and for wall paper. Suitable textiles are e.g. woven or non-woven cotton, jute, nylon, "Terylene," rayon, glass fibre and suitable plastics are e.g. polyvinylidene chloride and its copolymers, nitrocellulose, acrylonitrile-butadiene-styrene copolymers and natural and synthetic rubbers, all well known in the art. Using such plastic sheet, a composite roof sheet may be made, in one operation, which has an external metal surface, an intermediate insulation layer and a decorative, strong, washable interior face sheet, satisfying aesthetic requirements of the building industry.

When it is desired to form a laminate consisting of the non-planar second skin and the foam layer only, the substrate is made of dispensable material e.g. paper or cheap plastic film. It may then be removed by partly dissolving it off, e.g. by wetting paper with water or by tearing it off; for easier removal a lubricant may be predeposited on the film prior to foam casting to control or reduce adhesion of the foam on the film and to facilitate the subsequent removal of the film.

It is within our invention to form the second skin from a sequence of integers, including small integers which are not joined to each other but are fed towards the substrate-foam laminate in a pre-assembled array positioned on a conveyor belt. In this embodiment of the invention the inverted tacky foam picks up, bonds and, optionally, partially embeds and thus joins the individual integers. This process is particularly useful for the continuous manufacture of foam insulated assemblies of tiles, random arrangement or designed arrangements of insulated decorative stone block units, e.g. mosaics or pebbles and the like. In the case of rigid foams then there may thus be manufactured decorative structural building units which by virtue of a non-organic surface layer have increased fire resistance.

Accordingly we also provide a process as described characterised further in that the second skin consists of a pre-assembly of individual integers which are conveyed to said substrate-foam laminate by means of a conveyor belt. Optionally, said integers may, of course, also be linked by a provisional bonding means, such as adhesive tape which, after the permanent bond between said integers and the foam has formed, may be removed.

Techniques of producing foamed plastic materials, e.g. foams made of organic polymeric materials are well known. In some of these processes the foam is produced by agitation with air or other gases in a reactor from which the liquid issues already in the form of a foam and is subsequently merely allowed to solidify. In other so-called latent-foaming processes the foamable ingredients are deposited substantially in liquid form on an at least partly shape-determining means such as a tray, a belt or a mould or a rigid shell and both foaming and solidification occur on this means. The present invention is applicable to both rigid and flexible foams.

Foaming of a liquid plastic in an at least partly confined space such as a tray, a belt or a mould can be achieved by incorporating a blowing agent in a liquid or flowable thermoplastic or thermosetting material. Such blowing agents may be gases dissolved in the polymer or polymerisable mixture under pressure and released by reduction of pressure, or by heat or by both. One such technique has been described for polyvinyl chloride in the German journal "Kunststoffe," year 1958, pages 194–198. Another form of blowing agents are chemicals which are incorporated in the foamable plastic and which release a gas which is then trapped by the solidifying plastic. External heat, heat of reaction or chemical action such as the decomposition of calcium carbonate by acid catalysts used in the polymerisation reaction are commonly employed to release the gas from the blowing agent.

Examples of blowing agents selected randomly from the vast number of known chemicals are e.g. N,N'-dinitrosopentamethylene tetramine, N,N' - dimethyl-N,N'-dinitrosoterephthalimide and the volatile fluoroalkanes.

The present invention is applicable to all forms of rapidly setting plastic foams e.g. foams made of polystyrene, polyethylene, polyvinyl chloride, urea formaldehyde, phenol formaldehyde and epoxy resins.

The preferred plastic materials of our invention are the foamable polyurethanes and the preferred techniques of foaming are the known processes of producing polyurethane foams.

A second preferred foam is the foam described in pending Australian patent application No. 29,882/63 (corres. to U.S. Pats. 3,311,573, 3,311,574 and 3,311,575; and U.K. Pat. 991,970).

By "polyurethanes" we mean the materials produced by the interaction of organic polyisocyanates with hydroxyl group-containing polymers for example polyesters, polyesteramides and polyethers modified for example by the addition of water in order to produce blown, cellular materials.

In the case of foamed polyurethane materials, one available method consists in reacting the hydroxyl group-containing polymer in a single stage process with the organic polyisocyanate and water, if necessary in the presence of catalysts, surface active agents or other auxiliary agents, whereby simultaneous interaction between the isocyanate, water and the hydroxyl group-containing polymer takes place to give a foamed produce. Alternatively, the hydroxyl group-containing polymer may be reacted with sufficient polyisocyanate to give an intermediate reaction product containing isocyanate groups, and this product may then be reacted with water, if desired in the presence of catalysts, surface active agents or other auxiliary agents, in order to produce the final foamed product.

The starting materials to be used in the process of the present invention are those more fully described in the prior art relating to the manufacture of polyurethanes.

Suitable polyisocyanates include hexamethylene diisocyanate, tolylene-2:4 and 2:6-diisocyanates, diphenylmethane-4:4'-diisocyanate, 3 - methyl-diphenylmethane-4:4' - diisocyanate, m- and p-phenylene diisocyanates, chlorophenylene-2:4-diisocyanate and dicyclohexylmethane diisocyanate; triisocyanates and high polyisocyanates which may be used include 2:4:6-triisocyanatotolylene, 2:4:4'-triisocyanatodiphenylether and polymers of tolylene-2:4 and 2:6-diisocyanates. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

The hydroxy group-containing polymer may be, for example, a polyester, polyesteramide or polyether.

The polyesters or polyesteramides are made from dicarboxylic acids and glycols and, as necessary, diamines or aminoalcohols. Suitable dicarboxylic acids include succinic, glutaric, suberic, adipic, azelaic and sebacic acids as well as aromatic acids such as phthalic, isophthalic and terephthalic acids. Mixtures of acids may be used. Examples of glycols are ethylene glycol, 1:2-propylene glycol, 1:3-butylene glycol, diethylene glycol, trimethylene glycol, tetramethylene glycol, pentamethylene glycol, hexamethylene glycol, decamethylene glycol and 2:2-dimethyltrimethylene glycol. Mixtures of glycols may be used and polyhydric alcohols, such as trimethylolpropane, pentaerythritol or glycerol, may be included in varying amounts according to the desired rigidity of the products. Examples of diamines and aminoalcohols include ethylene diamine, hexamethylene diamine, monoethanolamine, phenylene diamines and benzidine.

As examples of polyesters for use in the process of the present invention there may be mentioned hydroxylended polymers and copolymers of cyclic ethers and especially of ethylene oxide, epichlorhydrin, 1:2-propylene oxide, 1:2-butylene oxide or other alkylene oxides, oxacyclobutane and substituted oxacyclobutanes and tetrahydrofuran. Such polyethers may be linear polyethers, as are prepared, for example, by the polymerisation of an alkylene oxide in the presence of a glycol initiator. Alternatively there may be used branched polyethers prepared for example by polymerising an alkylene oxide in the presence of a substance having more than two active hydrogen atoms, for example glycerol, pentaerythritol and ethylene diamine. Mixtures of linear and branched polyethers, or mixtures of polyesters and polyethers may be used if desired.

The interaction between the polyisocyanate, the hydroxyl-containing material, and any water employed may be carried out in a continuous or discontinuous manner using prior art methods. The interaction may be modified if desired by the incorporation of other ingredients and known adjuvants, including other catalysts either of a basic nature for example dimethylcyclohexylamine, triethylamine, dimethylbenzylamine, N-methylmorpholine, tetramethylguanidine, triethylenediamine, 4 - dimethylaminopyridine, potassium carbonate, potassium acetate, potassium naphthenate, basic lead acetate or non-basic metal, catalysts such as lead carboxylates, zinc or lead dilkyl dithiophosphates, acetylacetonates of the transition elements and other metals and tin compounds, for example di-n-butyl tin dilaurate and stannous octoate, non-ionic surface active agents, salts of sulphuric acid derivatives of high molecular weight organic compounds, silicone oils, for example alkyl and aryl polysiloxanes and copolymers thereof with alkylene oxides, foam stabilising agents, for example ethyl cellulose, low molecular weight polyhydroxy compounds such as trimethylolpropane, colouring matters, plasticisers, for example dialkyl phthalates, fireproofing agents for example tri-($\beta$-chloroethyl)phosphate or antimony compounds, antioxidants and "blowing agents" such as volatile fluoralkanes, or mixtures thereof.

We also provide apparatus for the continuous manufacture of laminates consisting of at least one foam layer of uniform texture confined between two skins of differing predetermined surface contours which apparatus comprises, in combination, a dispensing means for a flexible film substrate; means for causing said substrate to travel continuously; guiding means for said substrate; foam dispensing means capable of traversing the line of travel of said substrate at a right angle in a predetermined amplitude; means for guiding optionally, supporting and, optionally, heating the substrate-foam laminate; means for inverting said substrate-foam laminate through approximately 180°; means for transporting and guiding a second continuous skin having a non-planar surface to the foam-underside of said substrate-foam laminate; means for impressing the foam surface of said substrate-foam laminate on to said second skin; optionally, means for transporting said finished laminate continuously away from the apparatus; furthermore, optionally, means for preheating said second skin and, optionally, further means for heating it during its traverse through the apparatus; means for moving and adjusting said inverting means forward and backward in the direction of travel of the laminate; means for turning the edge of said substrate 90° towards the edges of the foam, which means, optionally, may be movable and adjustable in the direction of travel of said foam; optionally, means for adjusting the angle to the horizontal plane of the guiding means of said substrate and, optionally, means for adjusting the angle and force of compression of the means for impressing the foam surface of said substrate-foam laminate onto said second skin.

A preferred embodiment of the apparatus of our invention is now demonstrated by means of FIGS. 1, 2 and 3. FIG. 1 is a schematic perspective view; FIG. 2 is a cross-section through line AA' of FIG. 1 and FIG. 3 is a cross-section through line BB' of FIG. 1. In FIG. 1, number 1 is the rotatable dispensing means for continuous skin (substrate) 2; 3 are guiding rollers for 2; 4 are marking rollers marking and preforming the edge of said substrate 2; 5 is the form dispensing means having a discharge line 6a (shown as 6b—dotted—at the end of the reciprocating traverse across said substrate 2) and being supported on rollers 7 and capable of a reciprocating traverse by means of known apparatus not shown; 8 is the rising layer of foam; 9 is the edge forming tool consisting of a guiding rail shown in cross-section in FIG. 3; 10 is the now self-supporting edge of the foam; 11a, 11b and 11c are the supporting means i.e. the casting table provided with heating coils 12 and separated into zones 11a, 11b and 11c which may be controlled by heaters 12 to different temperatures, and the angle to the horizontal plane of which may be adjusted by means of screws 13; 14 is the inverting means namely a roller adjustable in the horizontal plane in the direction of arrow 15; 16 is the continuous belt of the second non-planar skin, namely a belt formed by means of clamps not shown from a series of aligned grooved galvanised iron roofing sheet; 17 is a guiding means for said belt namely rollers running in the grooves of said sheets; 18 is a gas heating unit, 19 are supporting rollers; 20 are two skids serving as means for impressing the substrate-foam laminate onto the belt of grooved roofing sheet; 21 are further edge-turning tools for compressing the free edges 22 of the substrate 2 against the preformed edge 10 of the foam layer; 23 is the completed and cured laminate of the foam confined between the two skins of predetermined and differing surface contours which laminate is shown in cross-section A–A' in FIGS. 2 and 24 are conveyor belts for removing the finished article which also provided the driving force for the continuous movement of the substrate. FIG. 2 shows the foam layer 8 impressed upon the grooved rofing sheet 16 and the unfilled grooves 27; FIG. 3 shows the rising of the foam at line B–B' in FIG. 1 and the beginning of the formation of the foam edge by means of edging rails 9 and the heating means 12.

Operation of our invention is now demonstrated by but not limited to the following examples.

EXAMPLE 1

A film of kraft paper 2 was fed to the apparatus of FIG. 1 at a rate of 26 feet per minute through rollers 3 underneath a reciprocating foam dispensed 5. The foaming mixture consisting of a so-called one-shot polyethertolylene diisocyanate based polyurethane mixture containing a siloxane-alkylene oxide condensation product as the pore size controlling agent and a tinoctoate catalyst was deposited in a zig-zag pattern on substrate 2 and travelled on the substrate across the sections 11a, 11b and 11c of the casting table which, by means of screws 13, was adjusted to an angle of 7° to the horizontal plane. The casting table section 11a, 11b and 11c were heated by means of coils 12 to 30° C., 35° C. and 40° C. respectively and the foam residence time on table 11a, 11b and 11c was 25 seconds; the roller 4 imparted a small groove to the paper which facilitated the formation of the edge near section BB' by means of edging rail 9; at the point where the foam edge was self-supporting and in a highly viscous but still plastic form the substrate-foam laminate was inverted around roller 14 through 173°. A pre-formed profiled ribbon 16 of galvanised iron sheeting linked together by means of strong plastic tape was preheated by gas heater 18, guided by means of rollers 19 to the underside of the laminate and the foam underside was pressed against the flat side of the iron sheeting by means of skids 20; the free edges of the substrate were pressed against the foam edges 10 by means of a further edging tool 21. The compiled double skin laminate 23, shown in cross-section in FIG. 2 was transported away from the machine by means of conveyor belts 24. There was thus formed a laminate having a water-proof profiled iron sheet surface on one side and a completely smooth planar surface on the opposite side, with neatly finished edges; the laminate was an excellent acoustic and thermal insulator, it had high structural strength and flexibility, was strongly bonded and was suitable for the construction of insulated roofs in one step, forming both the outside and the underside of said roof. The aesthetic appearance of the substrate-foam underside of the sheet was satisfactory. A considerable advantage in the use of the sheet was that condensation of moisture on the underside of the iron sheet was prevented because of its thermal insulation and because of the presence of a protective layer. This, in turn, prevented corrosion of the metal sheeting on the underside.

EXAMPLE 2

Example 1 was repeated but polypropylene film covered with a very thin layer of liquid paraffin lubricant was used as substrate. This did not bond strongly to the polyurethane and could be torn off after the foam had fully cured, without damage to the smooth appearance of the foam. There was thus obtained a two component laminate identical in shape to the three component laminate of Example 1 having a polyurethane foam surface.

EXAMPLE 3

Example 1 was repeated using, however, in place of the film of kraft paper a cloth-backed polyvinyl chloride sheet. On to this sheet polyurethane foam was deposited and the substrate-foam laminate was inverted and bonded to steel roofing sheets in the manner described in Example 1. There was thus obtained a laminate having an external steel roofing surface and a decorative internal wall sheet finish, insulated by an intermediate foam layer, which laminate provided an externally and internally fully finished roofing unit.

EXAMPLE 4

Example 3 was repeated but instead of roofing sheet 16 shown in FIG. 3 a mosaic of multi-coloured square stones such as conventionally used in decorative stone masonry was fed continuously on to the tacky underside of the inverted substrate-foam laminate. The coloured mosaic stones, about ¾ inch long and wide and ¼ inch thick were pre-assembled on a trough-like conveyor belt, having a vertical edge on either side, in such a manner that they completely filled the belt without gaps between the stones and formed an apparently continuous sheet, although initially the stones were not bonded to each other. The still tacky polyurethane foam was then firmly pressed against the stones by skids similar to those shown schematically in FIG. 1 as item 20 until they were bonded on to the foam layer. They could then be lifted from the supporting trough-like conveyor belt and the whole laminate was conveyed away from the machine by a further conveyor belt. There was thus obtained a rigid laminate having as an interior surface a decorative polyvinyl chloride sheet which was suitable as a wall paper and an exterior side consisting of a decorative stone mosaic, both supported by a layer of rigid insulating polyurethane.

EXAMPLE 5

Example 1 was repeated but instead of rigid polyurethane a composition according to Example 1 of Australian patent application No. 29,882/63 which was published on Oct. 29, 1964 as Australian specification 280,435 (said Example 1 corresponding with Example 1 of U.S. Pat. 3,311,574, issued Mar. 28, 1967), was used; it was stirred for 60 seconds before it was fed to the foam distributor; otherwise the experimental arrangement and process was as described in Example 1. There was thus obtained a laminated roofing unit.

Example 1 of said Australian application No. 29,882/63, Australian specification 280,435 and U.S. Pat. 3,311,574 involves the following:

Example 1

200 g. of 3,4-dihydro-2H-pyran-2-methyl - (3,4-dihydro-2H-pyran-2-carboxylate) were mixed with 50 g. of trichloromonofluoromethane, 2.5 g. of a boron trifluoride solution made up from $BF_3$ etherate containing 49% $BF_3$ diluted to 10% $BF_3$ with diethylene glycol, and 5.0 g. of siloxane oxyalkylene copolymer type silicone surfactant.

The induction period before foaming for this mixture was about 60 secs., and the mixture was stirred vigorously until just before foaming began. It was then poured rapidly into a mold and reacted to yield a rigid foam having density of about 2.5 lbs./cu. ft.

We claim:
1. A process for the continuous manufacture of foam laminates consisting of a least one foam layer of uniform texture confined between two skins of differing predetermined surface contours which process comprises passing a first flexible skin having a surface of a predetermined desired shape continuously through guiding means underneath a foam dispenser, depositing an even layer of foam on said first skin, while the latter either is sufficiently rigid in itself or by means of supports is made sufficiently rigid to impart its own shape to the underside of the foam, causing said foam layer to rise while travelling with said first skin, to adhere to it and to set to such consistency that essentially it ceases to flow under the force of gravity, inverting said first skin-and-foam-layer laminate while the foam is still tacky and impressing the tacky foam surface on to a second continuous skin having a nonplanar surface of a predetermined desired shape and travelling at the same speed and in the same direction as and in close proximity to and underneath the inverted first skin-foam laminate and causing said foam to fully cure and bond to both skins.

2. A process according to claim 1 wherein the foam is a polyurethane foam.

3. A process according to claim 1 wherein the foam is formed from a plastic material selected from the group consisting of polystyrene, polyvinylidene chloride, urea formaldehyde, epoxy resins and polyethylene.

4. A process according to claim 1 wherein inverting comprises turning the substrate-foam laminate at the point where the foam is a shaky, self-supporting and no longer freely flowing gel through an angle between approximately 180° and 180-alpha° about a roller guiding and contacting the substrate on its underside, wherein said angle alpha is the angle of inclination of said second skin to the horizontal plane.

5. A process according to claim 1 wherein the second continuous skin is formed from a metal sheet having reinforcing grooves or corrugations and suitable as a roofing material.

6. A process according to claim 1 wherein the second continuous skin is formed from at metal sheet having reinforcing grooves characterized in that that lateral portion of the sheet which, in final assembly, is to be joined laterally, overlappingly to an adjacent sheet of identical or similar shape, remains at least partly free from polyurethane.

7. A process according to claim 1 wherein said first flexible skin is a continuous plastic film.

8. A process according to claim 1 wherein said first flexible skin is a continuous paper sheet.

9. A process according to claim 1 wherein said first flexible skin is a continuous aluminum foil.

10. A process according to claim 1 wherein said first flexible skin is a continuous sheet of textile-reinforced plastic comprising a woven or non-woven textile substrate of a material selected from the group consisting of cotton, jute, rayon, nylon, polyethylene terephthalate, glass fiber and polypropylene and mixtures thereof, bonded with and at least partly embedded in a flexible plastic material selected from the group consisting of polyvinyl chloride, nitrocellulose, acrylonitrilebutadiene-styrene copolymers and natural and synthetic rubbers formulated with plasticisers, stabilizers, antioxidants, fillers and other additives for said textile-reinforced plastic sheet.

11. A process according to claim 1 wherein at least one edge of the first flexible film extends laterally beyond the deposited foam layer and is turned upwardly through 90° so as to form a lateral seal of the foam layer before the point of inversion.

12. A process according to claim 1 wherein at least one edge of the first flexible film extends laterally beyond the deposited foam layer and is turned upwardly through 90° so as to form a lateral seal of the foam layer before the point of inversion and wherein the inside of the folded-up edge of the first flexible film is pre-coated with an anti-adhesive layer preventing bonding of the polyurethane layer on to the folded-up film-edge.

13. A process according to claim 1 wherein at least one edge of the first flexible film extends laterally beyond the deposited foam layer and is turned upwardly through 90° so as to form a lateral seal of the foam layer before the point of inversion and wherein the inside of the folded-up edge of the first flexible film is pre-coated with an adhesive improving bonding of the polyurethane layer on to the folded-up film-edge.

14. A process according to claim 1 characterised further in that the residence time of the foam before inversion is adjusted by moving the inverting means forward or backward respectively, approximately in the direction of travel of the substrate.

15. A process according to claim 1 wherein the residence time of the foam before inversion is adjusted by means of a roller around which the substrate travels and the axis of which is movable both forward and backward approximately in the direction of travel of the substrate and which roller can be fastened in positions intermediate between its extremes of travel.

16. A process according to claim 1 wherein the second skin comprises a pre-assembled plurality of skins having a non-planar surface which are conveyed successively and substantially continuously to said substrate-foam laminate by continuously moving conveying means.

17. A process according to claim 1 wherein the second skin is formed from decorative discrete units forming a mosaic-like structure pre-assembled on a conveyor belt.

18. Apparatus for the continuous manufacture of laminates consisting of at least one foam layer of uniform texture confined between two skins of differing pre-determined surface contours, which apparatus comprises, in combination, the dispensing means for a plexible film substrate; means for causing said substrate to travel continuously; guiding means for said substrate; foam dispensing means capable of depositing foam across the width of said substrate to a pre-determined amplitude; means for guiding the substrate-foam laminate; means for inverting said substrate-foam laminate through approximately 180°; means for transporting and guiding a second continuous skin having a non-planar surface to the foam-underside of said inverted substrate-foam laminate; means for impressing the foam surface of said inverted substrate-foam laminate onto said second skin; means for transporting said finished laminate continuously away from the apparatus.

19. Apparatus according to claim 18 comprising in addition means for moving the inverting means for said substrate-foam laminate forward and backward approximately in the direction of travel of the laminate and means for fastening said inverting means in positions intermediate between its extremes of travel.

20. Apparatus according to claim 18 comprising in addition means for turning at least one uncovered edge of the film substrate through 90° towards the edge of the foam.

21. A process according to claim 1 wherein the open surface of the foam layer, prior to or at the point of inversion is cooled locally by a stream of inert gaseous coolant.

22. The apparatus of claim 18, wherein means are provided for supporting the substrate-foam laminate.

23. The apparatus of claim 18, wherein means are provided for heating the substrate foam laminate.

24. The apparatus of claim 18, wherein means are provided for pre-heating said second skin.

25. The apparatus of claim 24, wherein further means are provided for heating said second skin during its traverse through the apparatus.

26. A process according to claim 1, wherein the second skin is formed from a pre-assembled plurality of iron sheets.

References Cited

UNITED STATES PATENTS

| | | | |
|---|---|---|---|
| 1,924,635 | 8/1933 | Buffington | 156—79 |
| 2,866,730 | 12/1958 | Potchen et al. | 156—79 |
| 2,956,310 | 10/1960 | Roop et al. | 156—79 X |
| 3,037,897 | 6/1962 | Pelley | 156—79 X |
| 3,098,262 | 7/1963 | Wisotzky | 156—322 X |
| 3,123,856 | 3/1964 | Dye et al. | 156—79 X |
| 3,147,164 | 9/1964 | Adams | 156—79 X |
| 3,189,479 | 6/1965 | Coppick et al. | 156—79 X |
| 3,215,581 | 11/1965 | Carlson et al. | 156—79 X |
| 3,232,017 | 2/1966 | Prusinski et al. | 161—161 X |
| 3,305,381 | 2/1967 | Van Wagenen | 156—79 X |

JOHN T. GOOLKASIAN, Primary Examiner

C. B. COSBY, Assistant Examiner

U.S. Cl. X.R.

18—4; 156—467, 470, 500; 260—2.5; 264—47, 51